US011436501B1

(12) United States Patent
DeLuca et al.

(10) Patent No.: US 11,436,501 B1
(45) Date of Patent: *Sep. 6, 2022

(54) PERSONALIZATION OF A USER INTERFACE USING MACHINE LEARNING

(71) Applicant: Bottomline Technologies (de) Inc., Portsmouth, NH (US)

(72) Inventors: Norman DeLuca, Boston, MA (US); Brian McLaughlin, Hampton, NH (US); Fred Ramberg, North Hampton, NH (US); David Sander, Newmarket, NH (US)

(73) Assignee: Bottomline Technologies, Inc., Portsmouth, NH (US)

( * ) Notice: Subject to any disclaimer, the term of this patent is extended or adjusted under 35 U.S.C. 154(b) by 673 days.

This patent is subject to a terminal disclaimer.

(21) Appl. No.: 16/536,754

(22) Filed: Aug. 9, 2019

(51) Int. Cl.
*G06N 5/02* (2006.01)
*G06F 21/31* (2013.01)
*G06K 9/62* (2022.01)
*G06N 20/00* (2019.01)

(52) U.S. Cl.
CPC ........... *G06N 5/025* (2013.01); *G06F 21/316* (2013.01); *G06K 9/6223* (2013.01); *G06N 20/00* (2019.01)

(58) Field of Classification Search
CPC ...... G06N 5/025; G06N 20/00; G06F 21/316; G06K 9/6223
USPC .......................................................... 706/47
See application file for complete search history.

(56) References Cited

U.S. PATENT DOCUMENTS

| 5,875,108 | A | 2/1999 | Hoffberg |
| 6,400,996 | B1 | 6/2002 | Hoffberg |
| 7,725,419 | B2 | 5/2010 | Lee |
| 8,429,103 | B1 | 4/2013 | Aradhye |
| 8,990,688 | B2 | 3/2015 | Lee |
| 9,405,427 | B2 | 8/2016 | Curtis |
| 2002/0118223 | A1 | 8/2002 | Steichen |
| 2008/0114710 | A1 * | 5/2008 | Pucher ................... G06N 20/00 706/20 |
| 2009/0240647 | A1 | 9/2009 | Green |
| 2014/0317502 | A1 | 10/2014 | Brown |

(Continued)

FOREIGN PATENT DOCUMENTS

AU   2003288790 B2   2/2009
CN        110297885 A  * 10/2019   ......... G06F 16/3344

(Continued)

OTHER PUBLICATIONS

Liang et al., "An Unsupervised User Behavior Prediction Algorithm Based on Machine Learning and Neural Network for Smart Home," in IEEE Access, vol. 6, pp. 49237-49247, 2018, doi: 10.1109/ACCESS.2018.2868984. (Year: 2018).*

(Continued)

*Primary Examiner* — Peter C Shaw
(74) *Attorney, Agent, or Firm* — Richard A. Baker, Jr.

(57) ABSTRACT

A unique implementation of a machine learning application for suggesting actions for a user to undertake is described herein. The application transforms a history of user behavior into a set of models that represent user actions given a set of parameters. These models are then used to suggest that users in a payments or banking environment take certain actions based on their history. The models are created using the DensiCube, random forest or k-means algorithms.

16 Claims, 7 Drawing Sheets

(56) References Cited

U.S. PATENT DOCUMENTS

| | | | |
|---|---|---|---|
| 2018/0300621 A1* | 10/2018 | Shah | G06N 3/08 |
| 2018/0349446 A1 | 12/2018 | Triolo | |
| 2020/0143698 A1* | 5/2020 | Park | G09B 7/00 |
| 2021/0389817 A1* | 12/2021 | Spinelli | G06K 9/6267 |

FOREIGN PATENT DOCUMENTS

| | | | | |
|---|---|---|---|---|
| CN | 111967645 B | * | 4/2022 | G06F 30/27 |
| CN | 114386688 A | * | 4/2022 | |
| EP | 1921572 A1 | * | 5/2008 | G06N 99/005 |
| JP | 2014106661 A | * | 6/2014 | |

OTHER PUBLICATIONS

Obukhov et al., "Implementation of Decision Support Subsystem in Electronic Document Systems Using Machine Learning Techniques," IEEE, 2019, pp. 1-6, doi: 10.1109/FarEastCon.2019.8934879. (Year: 2019).*

Hartmann et al., "Federated Learning for Ranking Browser History Suggestions,", arXiv:1911.11807, 2019, pp. 1-9. (Year: 2019).*

Vassio et al., "Detecting user actions from HTTP traces: Toward an automatic approach," 2016 International Wireless Communications and Mobile Computing Conference (IWCMC), 2016, pp. 50-55, doi: 10.1109/IWCMC.2016.7577032. (Year: 2016).*

James Wilson, "How to take your UX to a new level with personalization", Medium blog, Oct. 24, 2018, found at https://medium.com/nyc-design/how-to-take-your-ux-to-a-new-level-with-personalization-1579b3ca414c on Jul. 29, 2019.

* cited by examiner

Figure 1

| 201 User | 202 Year | 203 Month | 204 Day | 205 Day of Week | 206 Hour | 207 Minutes | 208 Latitude | 209 Longitude | 210 Task | 211 Parameters | 212 Acct1 Balance | 213 Acct2 Balance | 214 Acct3 Balance |
|---|---|---|---|---|---|---|---|---|---|---|---|---|---|
| John | 2019 | 7 | 26 | Friday | 14 | 59 | 43.07048 | -70.80009 | Login | | | | -5000 |
| Bill | 2019 | 7 | 26 | Friday | 14 | 59 | 42.79537 | -70.99607 | Login | | | | -545 |
| John | 2019 | 7 | 26 | Friday | 15 | 1 | 43.07048 | -70.80009 | Check Balance | Acct1 | | | -5000 |
| John | 2019 | 7 | 26 | Friday | 15 | 2 | 43.07048 | -70.80009 | Check Balance | Acct2 | | | -5000 |
| John | 2019 | 7 | 26 | Friday | 15 | 3 | 43.07048 | -70.80009 | Transfer | 5000, Acct2, Acct1 | | | -5000 |
| Bill | 2019 | 7 | 26 | Friday | 15 | 3 | 42.79537 | -70.99607 | Login | | | | -545 |
| Bill | 2019 | 7 | 26 | Friday | 15 | 5 | 42.79537 | -70.99607 | Check Balance | Acct3 | | | -545 |
| Bill | 2019 | 7 | 26 | Friday | 15 | 9 | 42.79537 | -70.99607 | Transfer | 545, Acct1, Acct3 | | | 0 |

| 201 User | 202 Year | 203 Month | 204 Day | 205 Day of Week | 206 Hour | 207 Minutes | 208 Latitude | 209 Longitude | 210 Task | 211 Parameters | 212 Acct1 Balance | 213 Acct2 Balance | 214 Acct3 Balance |
|---|---|---|---|---|---|---|---|---|---|---|---|---|---|
| John | 2019 | 7 | 26 | Friday | 14 | 59 | 43.07048 | -70.80009 | Login | | 1,992 | 23,332 | -5000 |
| Bill | 2019 | 7 | 26 | Friday | 14 | 59 | 42.79537 | -70.99607 | Login | | 5,521 | 231 | -545 |
| John | 2019 | 7 | 26 | Friday | 15 | 1 | 43.07048 | -70.80009 | Check Balance | Acct1 | 1,992 | 23,332 | -5000 |
| John | 2019 | 7 | 26 | Friday | 15 | 2 | 43.07048 | -70.80009 | Check Balance | Acct2 | 1,992 | 23,332 | -5000 |
| John | 2019 | 7 | 26 | Friday | 15 | 3 | 43.07048 | -70.80009 | Transfer | 5000, Acct2, Acct1 | 6,992 | 18,332 | -5000 |
| Bill | 2019 | 7 | 26 | Friday | 15 | 3 | 42.79537 | -70.99607 | Login | | 5,521 | 231 | -545 |
| Bill | 2019 | 7 | 26 | Friday | 15 | 5 | 42.79537 | -70.99607 | Check Balance | Acct3 | 5,521 | 231 | -545 |
| Bill | 2019 | 7 | 26 | Friday | 15 | 9 | 42.79537 | -70.99607 | Transfer | 545, Acct1, Acct3 | 4,976 | 231 | 0 |

PERSONALIZATION OF A USER INTERFACE USING MACHINE LEARNING

PRIOR APPLICATION

This is a priority application.

BACKGROUND

Technical Field

The present disclosure relates generally to personalized user interfaces and more particularly to the use of machine learning to customize user interfaces with personalized suggestions.

Description of the Related Art

Personalization is a way by which a system identifies a user as a specific type of individual and then delivers relevant content and functionality to that user. Personalization can also be defined as the real-time individualization of a website or app, in order to suit the unique needs of each visitor and guide them through a custom conversion funnel.

When a website, app or any product is personalized, the user's needs or wants are anticipated. When the user gets something useful, without having to ask for it, it takes the user to a new level of user experience.

Personalization is dynamic. It learns and adapts. When you personalize a user experience, you are offering something useful based on users' characteristics, behaviors, attributes and/or data analysis. UX personalization is about creating an individualized experience that is relevant to and targeted towards a user's needs.

Personalization is similar to, but not identical, to specialization. Where personalization is focused on the individual, specialization focuses on a group.

In the payables or banking industries, users typically follow a similar routine, paying certain bills on certain dates, checking balances at certain times, transferring money based on certain situations. Since each user's job is different, these routines are unique to the user.

Previous work in the field has focused on personalizing information presented to users, but the industry is lacking the personalization of the routine, the actions, that a system could suggest that a user take. The present inventions resolves this issue.

SUMMARY OF THE INVENTIONS

A method for automatically suggesting actions to a user in a user interface is described herein. The method is made up of the steps of (1) receiving a set of input parameters, wherein the set of input parameters include information regarding time and user task, (2) accessing a list of possible actions, and (3) filtering the list of possible actions to remove the actions that are not available the user. The method further includes the steps of (3) looping through the filtered list of possible actions until the filtered list is processed, (3a) executing a machine learning model of user behavior on each possible action with the set of input parameters to obtain a machine learning score, and (3b) storing the machine learning score with the possible action. Once the list of possible actions is processed, (4) sorting the list of possible actions by the machine learning score, (5) selecting the possible actions with high machine learning scores, and (6) offering the user options to perform the possible actions. The machine learning model is built by iterating through possible rule sets to identify the rule set with a best quality score using a data set of previous user behavior.

The machine learning model is built using the DensiCube, distributed DensiCube, K-means, Expectation-maximization or Random Forest, or other machine learning algorithms. In some embodiments, the data set of previous user behavior includes multiple users. The data set of previous user behavior could utilize the data of the multiple users up to a threshold of data items for a specific user and then switches to solely using data from the specific user. In another embodiment, the data set of previous user behavior utilizes a graduated combination of data of the multiple users combined with the data from a specific user weighted by a factor based upon a number of data items for the specific user.

In one embodiment, the machine learning model is run twice, once to figure out the most important situations to address and a second time to figure out the proper action to suggest. Before the looping through the filtered list of possible actions, (2a) accessing a list of possible situations, (2b) looping through the list of possible situations until the list of possible situations is processed, (2b1) executing a situations machine learning model of user behavior on each possible situation with the input parameters to obtain a situations machine learning score, (2b2) storing the situations machine learning score with the possible situation, once the list of possible situations is processed, (2c) sorting the list of possible situations by the score, (2d) selecting the possible situations with high scores.

In some embodiments, automatically undertaking the action. In some embodiments the input parameters also include location information.

A system that automatically suggests actions to a user in a user interface is also described herein. The system is made up of a special purpose server, a data storage device electrically connected to the special purpose server, where the data storage device holds a history of user behavior, a list of possible actions and models of the user behavior, an internet connected to the special purpose server, and a computing device connected to the internet.

The user uses the computing device to log into an application, the application sends input parameters (information regarding time, user task, etc) to the special purpose server. The special purpose server accesses the list of possible actions and filters the list of possible actions to remove the actions that are not available the user. The special purpose server loops through the filtered list of possible actions until the list is processed, while the special purpose server executes a machine learning model on each possible action with the input parameters to obtain a machine learning score and stores the machine learning score with the possible action. Once the special purpose server processes the list of possible actions, the special purpose server sorts the list of possible actions by the score, selects the possible actions with high scores, and offers the user options to perform the possible actions. The machine learning model is built by the special purpose server through iterations of possible rule sets to identify the rule set with a best quality score using a data set of previous user behavior.

BRIEF DESCRIPTION OF THE DRAWINGS

The annexed drawings, which are not necessarily to scale, show various aspects of the inventions in which similar reference numerals are used to indicate the same or similar parts in the various views.

DETAILED DESCRIPTION

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present disclosure provides in one embodiment of the personalization of a user interface using machine learning.

Figure 1:
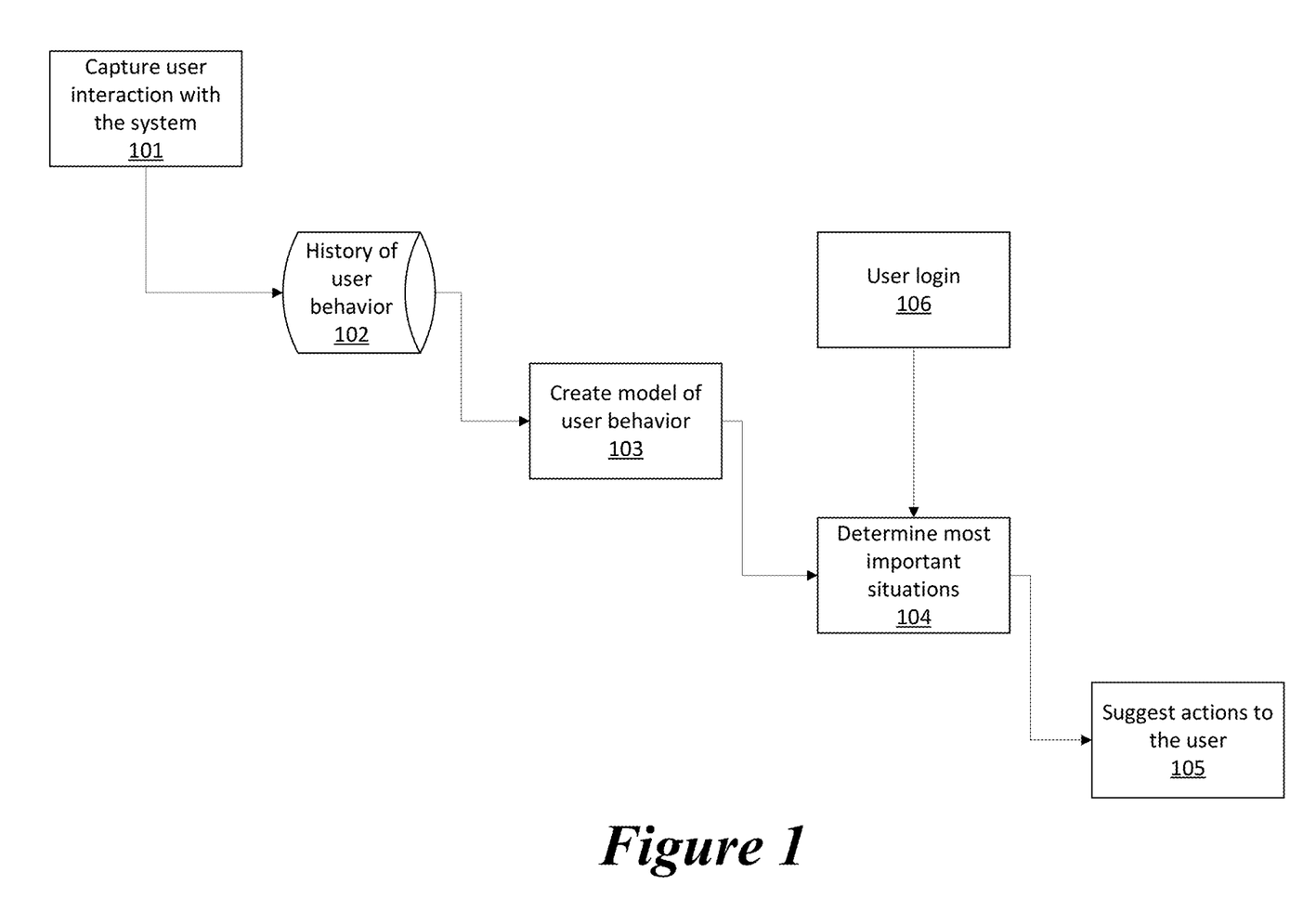
FIG. 1 is a schematic diagram of the overall architecture of the personalization system.
Figure 2:
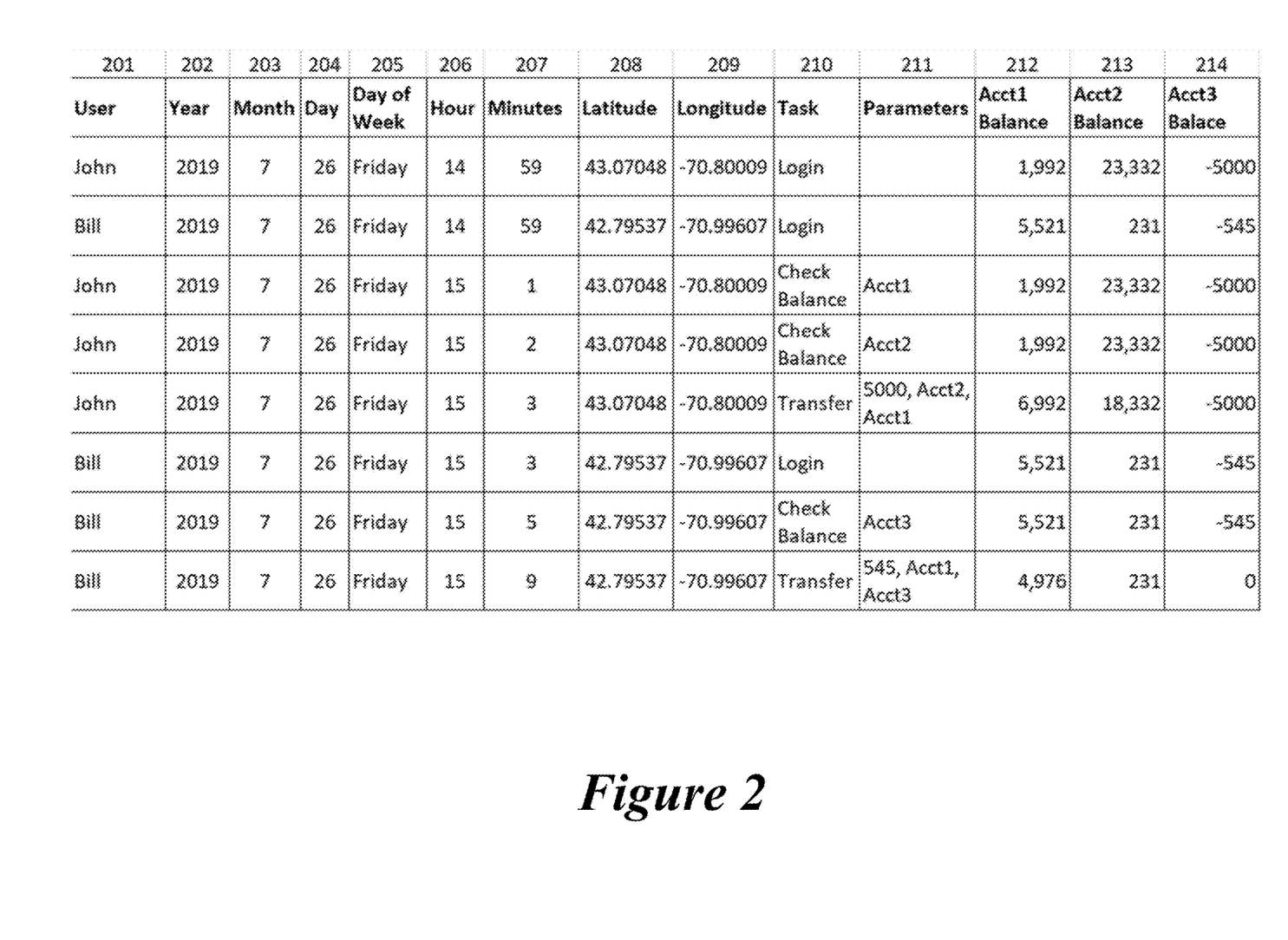
FIG. 2 is a sample data set.

Looking to FIG. 1, the system begins by collecting data on the routines of the users 101. This is done by capturing all of the interactions of the users. Typically this is done by inserting code in the user interface to capture all keystrokes in one embodiment, or by capturing the function calls, with their parameters, at a key juncture in the code, perhaps at the main user interface input processing loop. This data may include date 202,203,204,205, time 206,207, location 208, 209, user name 201, account balances 212,213,214, task performed 210, and parameters 211 for the task. The preceding and following tasks 210 may also be recorded, either by storing the data as a linked list, or by maintaining order in a spreadsheet type data structure. In other embodiments this database 102 is simply an ASCII, XML, JSON or YAML log file.

The data 201-214 is stored in a database 102. In some embodiments, the database 102 holds the data for all users, and in other embodiments the database 102 only holds the data for a single user. FIG. 2 shows a sample data set. This data is collected over time, perhaps years, to build up a large set of data.

While creating and storing the data, a list of the unique actions 602 could also be created by storing the actions in a list. This list could be sorted alphabetically or using a hash algorithm to increase performance.

Figure 3:
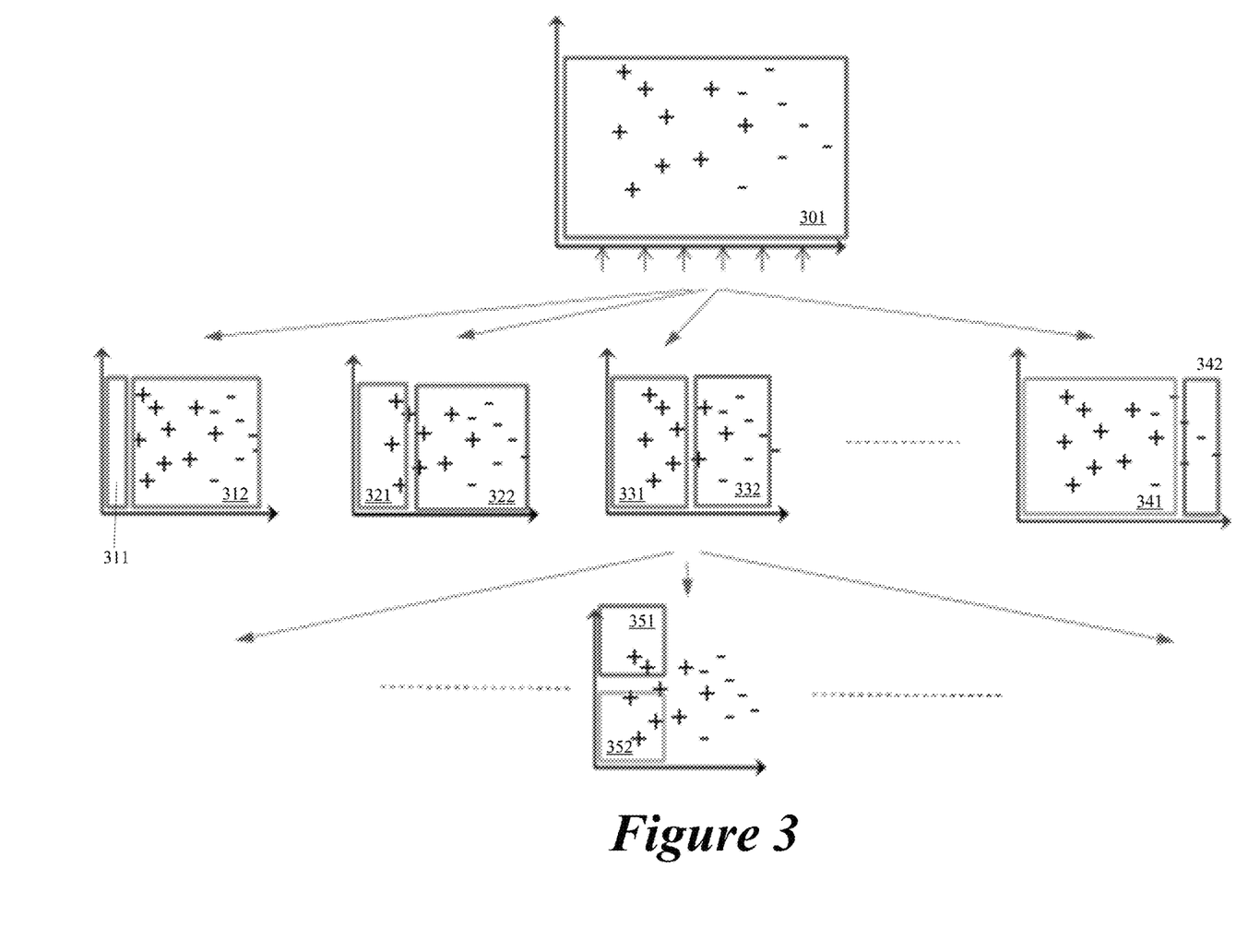
FIG. 3 is a diagram of the DensiCube clustering algorithm in action, showing search based rule specialization.
Figure 4:
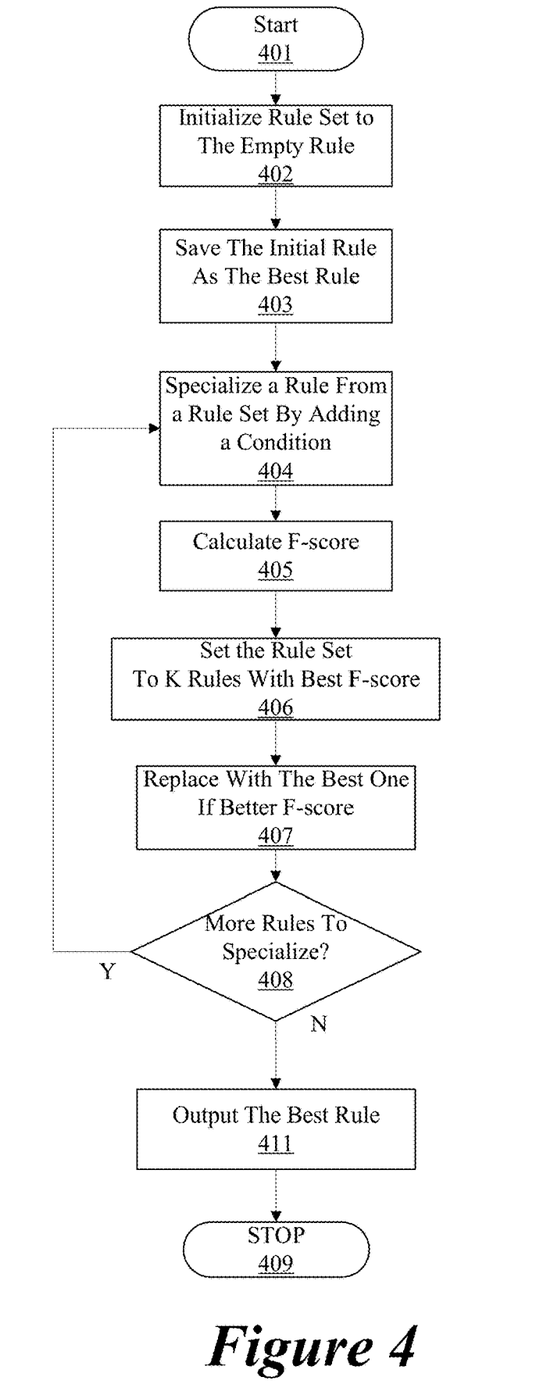
FIG. 4 is a flow chart of the DensiCube machine learning algorithm.
Figure 5:
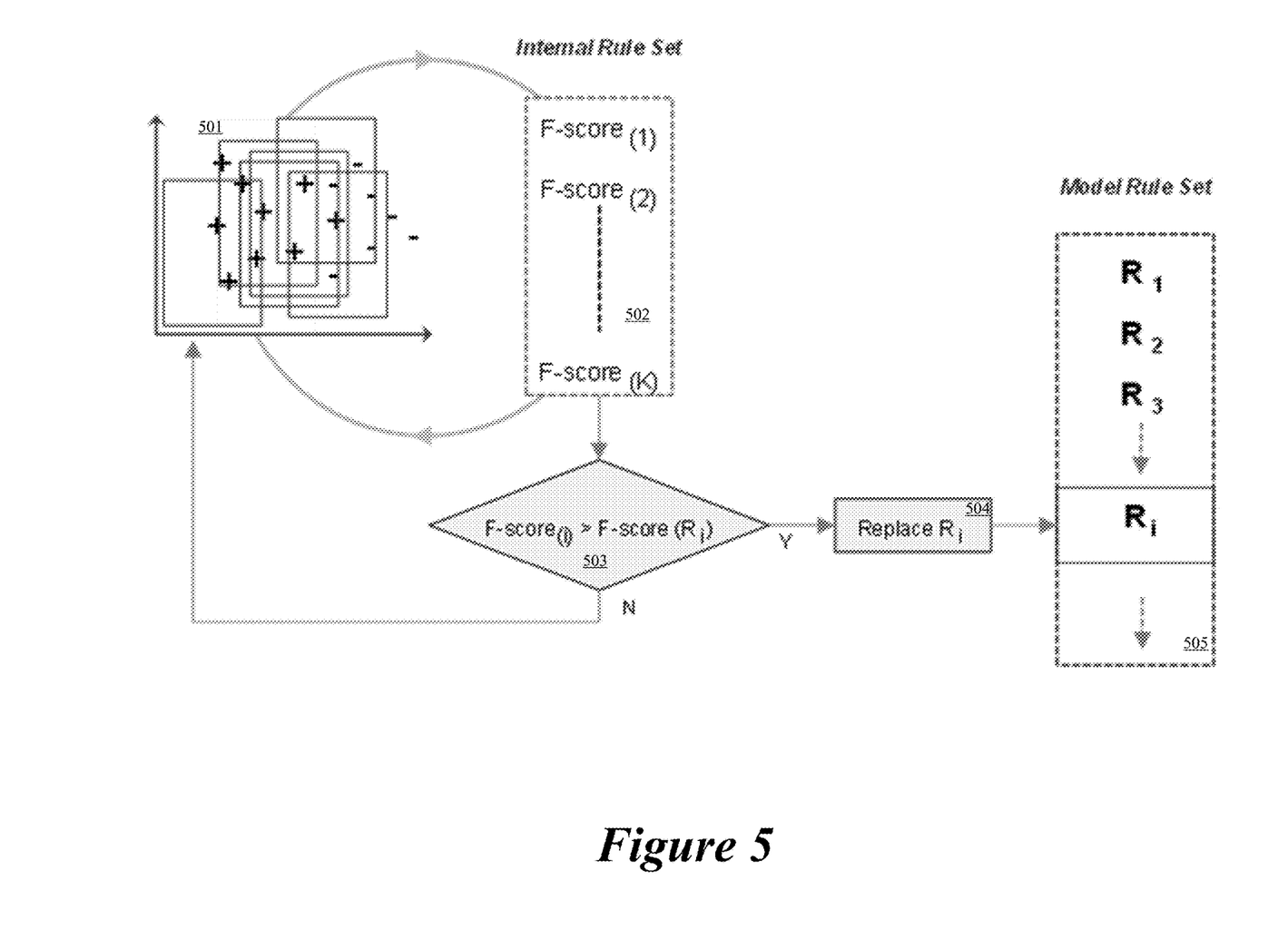
FIG. 5 is a diagram of the DensiCube machine learning algorithm creating the model rules set.

Periodically, the data is analyzed to create a machine learning rules model of user behavior 103. In some embodiments, the model of user behavior 103 is generated daily, although any other period could be used. In other embodiments, the model is generated based on the amount of data collected, or randomly, or based on any other criteria. In another embodiment, the model could be generated whenever a user logs in 106. FIGS. 3, 4, 5 show a DensiCube algorithm for generating the machine learning model of user behavior 103, but other embodiments use a K-means algorithm or a Random Forest machine learning algorithm (or other machine learning algorithms). These models of user behavior 103 are stored until needed.

When the user logs in 106 to the system, various parameters are collected such as date 202,203,204,205, time 206,207, location 208,209, and user name 201. This data is passed to the function that determines the most important situations 104 to display for the user. The function 104 also incorporates the model of user behavior, and determines the most relevant information to the user. This is also used to create a list of suggested actions 105 for the user. Essentially, the function uses the various parameters as input to the model of user behavior for each task in the list of possible actions 602. The model of user behavior returns a confidence score for each action in the list of possible actions 602. The list of possible actions 602 is then sorted by confidence scores. The top scores correspond to the most relevant information and actions. In some embodiments, the actions are further filtered by the user's capacities and permissions, so that the users is not asked to perform an action beyond their role. This function 104, 105 is discussed in further detail in FIG. 6.

In some embodiments, the machine then implements the action, taking the additional step beyond recording the actions 101, to determining the important aspects of the current situation 104, to suggesting actions 105, to the taking the action, without user interaction.

Sample Data Set

FIG. 2 is an example of the dataset. In this embodiment, the data is stored in a spreadsheet format, sorted by date and time. Each row is a separate interaction from a user. The User 201 column has the name of the user. This could be replaced by an identifying number (such as a social security or account number) or by the full name of the user (or a company name). The Year 202, Month 203, Day 204, and Day of the Week 205 specify the date of the transaction, because the machine learning algorithms may find that some activities are performed on every Tuesday, or on the first day of the month. Similarly, the time of the transaction is broken out into an Hour 206 and Minutes 207 for analysis. The location information is specified in Latitude 208 and Longitude 209 columns in this embodiment, although the location could also include a height component, or could be specified as a street address or other location specification method.

The task 210 is specified in the next column. This could be an ASCII string, a number that corresponds to a task, or it could be a computer address of the task function, in other embodiments. If the task 210 has parameters 211, they are stored in the Parameters 211 column. If the task 210 has no parameters 211, these cells are empty. Additional information could be stored in the database that may be relevant to the user's actions, such as account balances 212,213,214, stock market prices, interest rates, etc.

The K-Means Machine Learning Algorithm

One option for creating the model of user behavior is through the K-means machine learning algorithm. The objective of K-means is simple: group similar data points together and discover underlying patterns. To achieve this objective, K-means looks for a fixed number (k) of clusters in a dataset. A cluster refers to a collection of data points aggregated together because of certain similarities.

A target number k is defined, which refers to the number of centroids needed in the dataset. A centroid is the imaginary or real location representing the center of the cluster. Every data point is allocated to each of the clusters through reducing the in-cluster sum of squares.

In other words, the K-means machine learning algorithm identifies k number of centroids, and then allocates every data point to the nearest cluster, while keeping the centroids as small as possible. The 'means' in the K-means refers to averaging of the data; that is, finding the centroid. To process the learning data, the K-means algorithm in data mining starts with a first group of randomly selected centroids, which are used as the beginning points for every cluster, and then performs iterative (repetitive) calculations to optimize the positions of the centroids. It halts creating and optimizing clusters when either:

The centroids have stabilized—there is no change in their values because the clustering has been successful.

The defined number of iterations has been achieved.

The Random Forest Machine Learning Algorithm

In the random forest machine learning algorithm, another embodiment for creating the model for user behavior, the logic creates a series of a decision trees. In the creation of the decision trees, at each node, it will ask what feature will allow splitting the observations at hand in a way that the resulting groups are as different from each other as possible (and the members of each resulting subgroup are as similar to each other as possible)?

Random forest, like its name implies, consists of a large number of individual decision trees that operate as an ensemble. Each individual tree in the random forest spits out a class prediction and the class with the most votes becomes our model's prediction.

The fundamental concept behind random forest is a simple but powerful one—the wisdom of crowds. In data science speak, the reason that the random forest model works so well is that a large number of relatively uncorrelated models (trees) operating as a committee outperform any of the individual constituent models.

The low correlation between models is the key. Just like how investments with low correlations (like stocks and bonds) come together to form a portfolio that is greater than the sum of its parts, uncorrelated models can produce ensemble predictions that are more accurate than any of the individual predictions. The reason for this wonderful effect is that the trees protect each other from their individual errors (as long as they don't constantly all err in the same direction). While some trees may be wrong, many other trees will be right, so as a group the trees are able to move in the correct direction. So the prerequisites for random forest to perform well are the need to be some actual signal in our features so that models built using those features do better than random guessing, and the predictions (and therefore the errors) made by the individual trees need to have low correlations with each other.

DensiCube Machine Learning Algorithm

A third option for creating the model of user behavior is the DensiCube algorithm (or the distributed DensiCube algorithm. The DensiCube rule learning algorithm induces a set of rules. A rule itself is a conjunction of conditions, each for one attribute. A condition is a relational expression in the form:

$$A = V,$$

where A is an attribute and V is a nominal value for a symbolic attribute or an interval for a numeric attribute. The rule induction algorithm allows for two important learning parameters: minimum recall and minimum precision. More specifically, rules generated by the algorithm must satisfy the minimum recall and minimum precision requirements as set by these parameters. The algorithm repeats the process of learning a rule for the target class and removing all target class examples covered by the rule until no rule can be generated to satisfy the minimum recall and minimum precision requirements. In a distributed DensiCube algorithm, the removal of the positive examples covered by the rule is done in parallel at each of the distributed servers that hold the data. See U.S. patent application Ser. No. 16/355,985, "A Distributed Predictive Analytics Data Set", filed on 18 Mar. 2019 by Jerzy Bala and Paul Green, said patent application incorporated herein by reference, for more information.

In learning a rule, as seen in FIG. 3, the algorithm starts with the most general rule 301, which covers the entire feature space (all examples both positive and negative) and then conducts a general-to-specific beam search. At each step of the search, the algorithm maintains a set of k best rules (rules with the largest F-measure scores), where k is a user defined parameter. A smaller k translates into a smaller search space, hence a faster search. Each of the best rules is specialized by either adding a new condition or reducing the interval of a condition of a numeric attribute. This search process repeats until the recalls of all rules are smaller than the minimum recall and the best rule is the rule generated by the rule search process. However, any rule learning approach that follows the covering rule generation schema can be used here (i.e., search for the "best" rule, remove the data explained/covered by this rule, and repeat the search process).

Looking at 311, 312, the rule 312 covers all of the positive and negative values, and rule 311 is empty. This rule set is then scored and compared to the base rule 301. The best rule is stored.

Next, the algorithm increments the x-axis split between the rules, creating rule 321 and 322. The rules are scored and compared to the previous best rule.

Again, the algorithm increments the x-axis split between the rules, creating rule 331 and 332. The rules are scored and compared to the previous best rule.

The process is repeated until all but one increment on the x-axis is left. These rules 341, 342 are then scored (using an F-score), compared, and stored if the score is better.

Once the x-axis has been searched, the best rules are then split on the y-axis (for example, 351,352) to find the best overall rule. This process may be repeated for as many axes as found in the data.

In the Distributed DensiCube algorithm, the functions shown in FIG. 3 are performed independently on multiple data silos operating on the different features that reside on those silos.

FIG. 4 depicts the internal process of generating a singular rule. It starts 401 with the step of initializing the risk model with a rule that describes the whole representation space 402 (i.e., a rule with conditional parts satisfying all attributes values). The initial rule is stored as the best rule 403. This rule is iteratively specialized via a k-beam search process of re-referencing its value ranges for each of the attributes 404. The specialization includes calculating the F-score 405, setting the rule set to the K rules with the best F-score 406, and replacing the Best Rule if this rule has the better F-Score 407. This continues while there are more rules to specialize 408. If not, the algorithm outputs the Best Rule 411 and stops 409. The top k rules, based on the evaluation measure, are maintained on the candidate list 505 during this process. All the rules on the candidate list 505 are evaluated and ranked. The best rule from the candidate rule list (i.e., an internal rule set maintained by the beam search algorithm) enters the model rule list (FIG. 5).

In the Distributed DensiCube algorithm, the entire process described in FIG. 4 is distributed, performed on each data silo.

Looking at FIG. 5, the rule 501 is analyzed and the F-scores of each sub-rule is recorded in the internal rule set 502. If the F-score 502 for the rule 501 is greater than the last F-score 503, then the last rule is replaced by the new rule 504. Various algorithms could be reserved here, for instance, the rule set could be a sorted list of pairs of the rule set and the rule's F-score. Also, the statistics of other machine learning quality measures could be used. When comparing 503, the list is searched and the new rule inserted 504, dropping off the lowest scoring rule set. Overall, the algorithm searches through the possible rules sets for the best quality score.

Every rule induction algorithm uses a metric to evaluate or rank the rules that it generates. Most rule induction algorithms use accuracy as the metric. However, accuracy is not a good metric for imbalanced data sets. The algorithm uses an F-measure as the evaluation metric. It selects the rule with the largest F-measure score. F-measure is widely used in information retrieval and in some machine learning algorithms. The two components of F-measure are recall and precision. The recall of a target class rule is the ratio of the number of target class examples covered by the rule to the total number of target class examples. The precision of a target class (i.e., misstatement class) rule is the ratio of the number of target class examples covered by the rule to the total number of examples (from both the target and non-target classes) covered by that rule. F-measure of a rule r is defined as:

$$F - \text{measure}(r) = \frac{\beta^2 + 1}{\frac{\beta^2}{\text{recall}(r)} + \frac{1}{\text{precision}(r)}}$$

where $\beta$ is the weight. When $\beta$ is set to 1, recall and precision are weighted equally. F-measure favors recall with $\beta>1$ and favors precision with $\beta<1$. F-measure can be used to compare the performances of two different models/rules. A model/rule with a larger F-measure is better than a model/rule with a smaller F-measure.

Prototype Generation Algorithm for Ranking with Rules

The algorithms incorporate a method, called prototype generation, to facilitate ranking with rules. For each rule generated by the rule learning algorithm, two prototypes are created. In generating prototypes, the software ignores symbolic conditions, because examples covered by a rule share the same symbolic values. Given a rule R with m numeric conditions: $A_{R1}=V_{R1} \wedge A_{R2}=V_{R2} \wedge \ldots \wedge A_{Rm}=V_{Rm}$, where $A_{Ri}$ is a numeric attribute and $V_{Ri}$ is a range of numeric values, the positive prototype of R, $P(R)=(p_{R1}, p_{R2}, \ldots, p_{Rm})$ and the negative prototype of R $N(R)=(n_{R1}, n_{R2}, \ldots, n_{Rm})$, where both $P_{Ri} \in V_{Ri}$ and $n_{Ri} \in V_{Ri}$. $p_{Ri}$ and $n_{Ri}$ are computed using the following formulas:

$$p_{Ri} = \frac{\sum_{e \in R(POS)} e_{Ri}}{|R(POS)|} \text{ and } n_{Ri} = \frac{\sum_{e \in R(NEG)} e_{Ri}}{|R(NEG)|},$$

where R(POS) and R(NEG) are the sets of positive and negative examples covered by R respectively, $e=(e_{R1}, e_{R2}, \ldots, e_{Rm})$ is an example, and $e_{Ri} \in V_{Ri}$ for i=1, ..., m, because e is covered by R.

Given a positive prototype $P(R)=(p_{R1}, p_{R2}, \ldots, p_{Rm})$ and a negative prototype $N(R)=(n_{R1}, n_{R2}, \ldots, n_{Rm})$ of rule R, the score of an example $e=(e_{R1}, e_{R2}, \ldots, e_{Rm})$ is 0 if e is not covered by R. Otherwise, e receives a score between 0 and 1 computed using the following formula:

$$\text{score}(e, R) = \frac{\sum_{i=1}^{m} w_{Ri} \frac{|e_{Ri} - n_{Ri}| - |e_{Ri} - p_{Ri}|}{|p_{Ri} - n_{Ri}|} + \sum_{i=1}^{m} w_{Ri}}{2 \times \sum_{i=1}^{m} w_{Ri}}$$

where $w_{Ri}$ is the weight of $Ri^{th}$ attribute of R. The value of $$\frac{|e_{Ri} - n_{Ri}| - |e_{Ri} - p_{Ri}|}{|p_{Ri} - n_{Ri}|}$$

is between −1 and 1. When $e_{Ri}>n_{Ri}>p_{Ri}$ or $p_{Ri}>n_{Ri}>e_{Ri}$ it is −1. When $e_{Ri}>p_{Ri}>n_{Ri}$ or $n_{Ri}>p_{Ri}>e_{R}$, it is 1. When $e_{Ri}$ is closer to $n_{Ri}$ than $p_{Ri}$, it takes a value between −1 and 0. When $e_{Ri}$ is closer to $p_{Ri}$ than $n_{Ri}$, it takes a value between 0 and 1. The value of score(e, R) is normalized to the range of 0 and 1. If $p_{Ri}=n_{Ri}$, then $$\frac{|e_{Ri} - n_{Ri}| - |e_{Ri} - p_{Ri}|}{|p_{Ri} - n_{Ri}|}$$

is set to 0.

$w_{Ri}$ is computed using the following formula.

$$w_{Ri} = \frac{|p_{Ri} - n_{Ri}|}{\max_{Ri} - \min_{Ri}},$$

where $\max_{Ri}$ and $\min_{Ri}$ are the maximum and minimum values of the $Ri^{th}$ attribute of R, respectively. The large difference between $p_{Ri}$ and $n_{Ri}$ implies that the values of positive examples are very different from the values of negative examples on the $Ri^{th}$ attribute, so the attribute should distinguish positive examples from negative one well.

Scoring Using Rules

A rule induction algorithm usually generates a set of overlapped rules. Two methods, Max and Probabilistic Sum, for combining example scores of multiple rules are used by the software. Both methods have been used in rule-based expert systems. The max approach simply takes the largest score of all rules. Given an example e and a set of n rules $R=\{R_1, \ldots, R_n\}$, the combined score of e using Max is computed as follows:

$$\text{score}(e,R) = \max_{i=1}^{n}\{\text{Precision}(Ri) \times \text{score}(e,R_i)\},$$

where precision($R_i$) is the precision of $R_i$. There are two ways to determine score(e, $R_i$) for a hybrid rule. The first way returns the score of e received from rule $R_i$ for all e's. The second way returns the score of e received from $R_i$ only if the score is larger than or equal to the threshold of $R_i$, otherwise the score is 0. The first way returns. For a normal rule, $$\text{score}(e, R_i) = \begin{cases} 1 \text{ if } e \text{ is covered by } R_i \\ 0 \text{ Otherwise} \end{cases}$$

For the probabilistic sum method, the formula can be defined recursively as follows.

$$score(e, \{R_1\}) = score(e, R_1)$$

$$score(e, \{R_1, R_2\}) = score(e, R_1) + score(e, R_2) - score(e, R_1) \times score(e, R_2)$$

$$score(e, \{R_1, \ldots, R_n\}) = score(e, \{R_1, \ldots, R_{n-1}\}) + score(e, R_n) - score(e, \{R_1, \ldots, R_{n-1}\}) \times score(e, R_n)$$

In some embodiments, particularly when starting out with a new customer, there may not be enough data on the customer's activities to create a meaningful model of user behavior. In this embodiment, the aggregated data from multiple users could be used to create the model until enough data is collected on the specific user. In one embodiment, the weight of the individual user's data is gradually increased until the multiple user data is phased out (this could be achieved by creating two models, one for the specific user and one from the aggregated data, and weighted averaging the results when the model is run). In another embodiment, thresholds are used. For instance, aggregated multi-user data is solely used until a threshold of 100 individual user events are logged in the database. After the threshold, all of the specific user's data could be used to create the model of user behavior.

Figure 6:
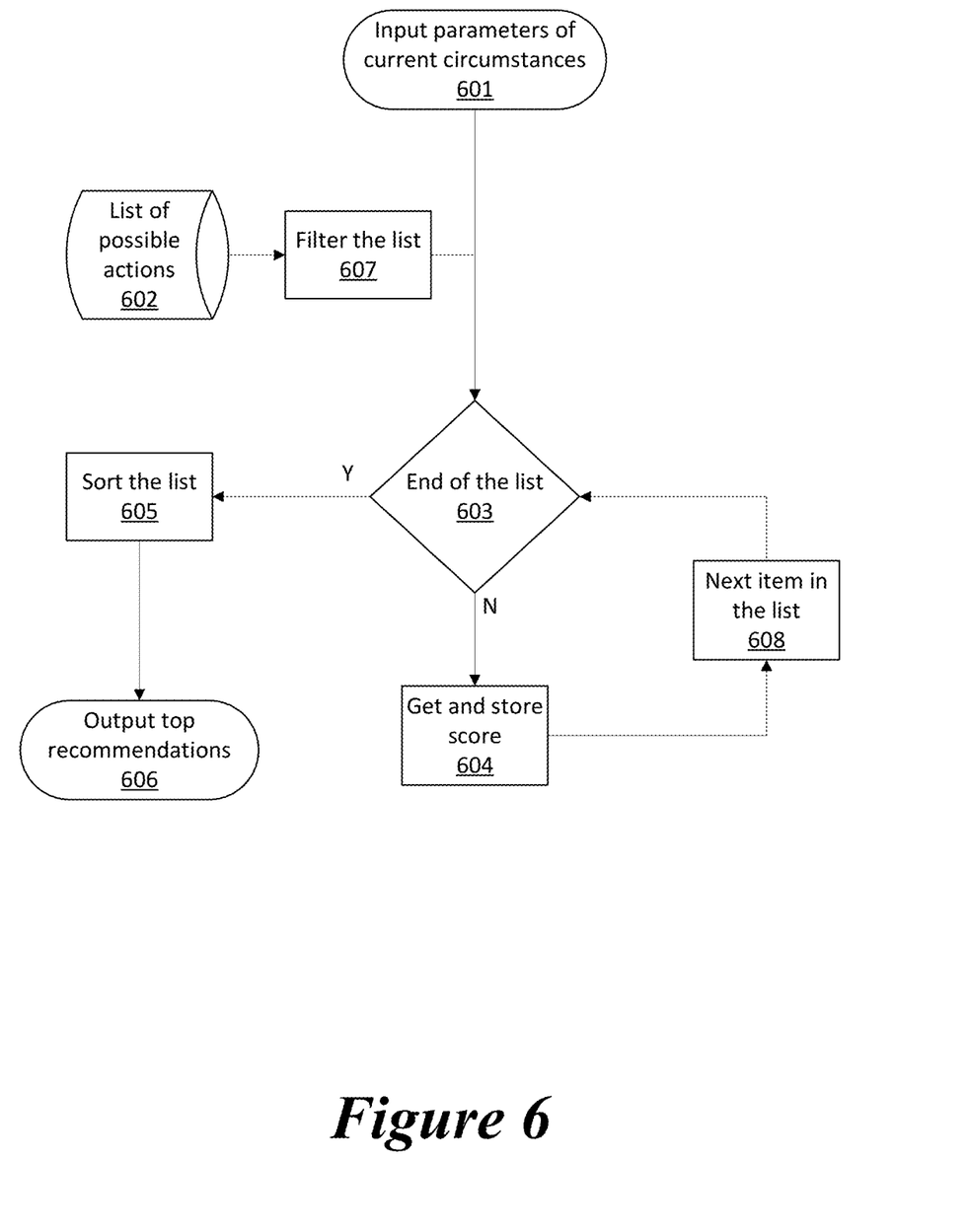
FIG. 6 is a flow chart of the determination of the recommended actions.

In some embodiments, a model is created for each task in the list of possible actions 602. This allows the model to be run for each action, creating a score for each action, and then ranking the actions by score.

FIG. 6 shows this algorithm in more detail. FIG. 6 shows the use of the machine learning model to determine the most relevant actions for the user. The algorithm starts with the set of input parameters of the current circumstances 601 as received from the login 106, for instance. However, the algorithm could be called surrounding any task that is to operate or that has just operated. The set of input parameters could come from a variety of sources.

The list of possible actions 602, created when the user interactions were captured in 101, are filtered 607 for actions that the user has permissions and capability to perform. For instance, if the list of actions includes an administrative task such as create new user but the user is not an administrator, then the "create new user" task is filtered out of the list.

The filtered list is then fed into a "for loop" 603, 608 that cycles through the list of possible actions. For each item in the filtered list, the model of user behavior is executed using the parameters and the specific task to create a machine learning score for this task 604. The score is stored in an array 604, and the next item in the list is retrieved for the "for loop" 608.

Once the entire list has been processed, the array of scores is sorted 605 by the highest scores, and the high machine learning scores are outputted 606. This outputting could be done by returning the top three recommended actions for display.

In some embodiments, the top scores are outputted as a descriptive suggestion of actions to the user. The user can then chose to perform the action. For instance, in our example in FIG. 2, if the machine learning algorithm notices that every time that John "Checks Balance" and sees that Acct1 is under $2000, he transfers $5000 from Acct2 to Acct1. When the execution of the model sees that the balance is below $2000, the machine will ask "Acct1 is below $2000. Would you like to transfer $5000 from Acct2 to Acct1?" In another embodiment, the machine takes the next step of automatically transferring the $5000 from Acct2 to Acct1.

In some embodiments, this is performed in multiple steps. First of all, the machine learning algorithms notice that when John logs in, he typically checks the balances, so the algorithm in FIG. 6 is run to determine the situation, noticing that the balance in Acct1 is low. Next, the algorithm in FIG. 6 is run a second time to determine the action, to suggest the movement of $5000 from Acct2 to Acct1. In some embodiments, the machine learning models may be run a third time to determine the amount to suggest.

Hardware Architecture

Figure 7:
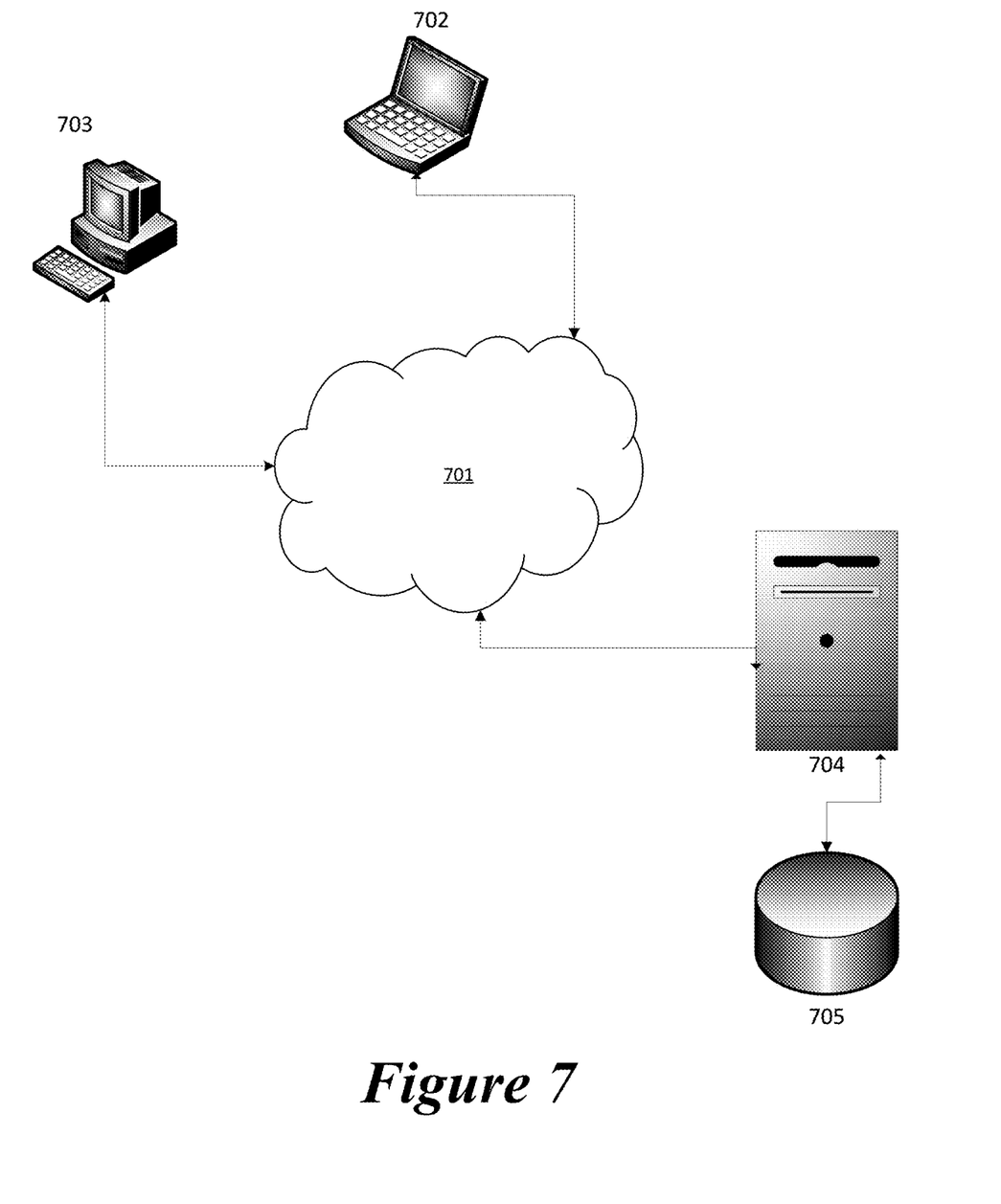
FIG. 7 shows a possible hardware implementation for operating the algorithms include herein.

FIG. 7 shows a possible hardware embodiment for the inventions described above. A special purpose server 704 is used to run the machine learning software to create the models (see FIG. 4). This special purpose server 704 is connected to a database storage device 705 that holds the history of user behavior 102 and the list of possible actions 602. The models of user behavior could also be stored in the database storage device 705. This database storage device 705 may include high speed, high capacity storage media such as a solid state drive or a high performance hard disk drive. The special purpose server 704 is designed to perform a large number of operations as required by a machine learning implementation, and has many processing cores to handle the machine learning processing in parallel. In some embodiments, the special purpose service and the high capacity storage 705 are a plurality of devices that execute the Distributed DensiCube machine learning algorithm in parallel from locations across the Internet.

Laptops 702 and/or personal computers 703 (and other computing devices such as mobile phones, smart watches, iPads, tablets, notebook computers, internet of things devices, etc.) connect through the Internet 701 (through the cloud) to the special purpose server 704. These computing devices 702, 703 typically serve as the user interface to the system. This is the device the user logs in on, and the device that displays the recommended actions. The models of user behavior and the algorithm to create the recommended actions could be run on the computing devices 702, 703, or could be run on the special purpose server 704 (or on another computer on the network).

It should be appreciated that many of the elements discussed in this specification may be implemented in a hardware circuit(s), a circuitry executing software code or instructions which are encoded within computer readable media accessible to the circuitry, or a combination of a hardware circuit(s) and a circuitry or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer readable media, or a combination of a hardware circuit(s) and a circuitry and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

The invention claimed is:

1. A method for automatically suggesting actions to a user in a user interface comprising:
receiving a set of input parameters, wherein the set of input parameters include information regarding time and user task;
accessing a list of possible actions;
filtering the list of possible actions to remove the actions that are not available to the user;
looping through the filtered list of possible actions until the filtered list is processed,
executing a machine learning model of user behavior on each possible action in the filtered list with the set of input parameters to obtain a machine learning score;
storing the machine learning score with the possible action in the filtered list;
once the filtered list of possible actions is processed, sorting the filtered list of possible actions by the machine learning score;
selecting the possible actions from the filtered list with high machine learning scores; and
offering the user options to perform the selected possible actions;
wherein the machine learning model is built by iterating through possible rule sets to identify the rule set with a best quality score using a data set of previous user behavior wherein the data set of previous user behavior utilizes the data of multiple users up to a threshold of data items for a specific user and then switches to solely using data from the specific user.

2. The method of claim 1 wherein the machine learning model is built using a DensiCube machine learning algorithm.

3. The method of claim 2 wherein the machine learning model is built using a distributed DensiCube machine learning algorithm.

4. The method of claim 1 wherein the machine learning model is built using a K-means machine learning algorithm.

5. The method of claim 1 wherein the machine learning model is built using a random forest machine learning algorithm.

6. The method of claim 1 wherein the data set of previous user behavior utilizes a graduated combination of data of the multiple users combined with the data from a specific user weighted by a factor based upon a number of data items for the specific user.

7. The method of claim 1 further comprising, before the looping through the filtered list of possible actions,
accessing a list of possible situations;
looping through the list of possible situations until the list of possible situations is processed,
executing a situations machine learning model of user behavior on each possible situation with the input parameters to obtain a situations machine learning score; and
storing the situations machine learning score with the possible situation;
once the list of possible situations is processed, sorting the list of possible situations by the score; and
selecting the possible situations with high scores.

8. The method of claim 1 further comprising automatically undertaking the action.

9. The method of claim 1 wherein the input parameters also include location information.

10. A system for that automatically suggests actions to a user in a user interface comprising:
a special purpose server;
a data storage device electrically connected to the special purpose server, where the data storage device holds a history of user behavior, a list of possible actions, and models of the user behavior;
an internet connected to the special purpose server;
a computing device connected to the special purpose server through the internet;
wherein the user uses the computing device to log into an application, the application sends input parameters to the special purpose server, wherein the input parameters include information regarding time and user task, the special purpose server accesses the list of possible actions and filters the list of possible actions to remove the actions that are not available to the user, wherein the special purpose server loops through the filtered list of possible actions until the list is processed, while the special purpose server executes a machine learning model on each possible action in the filtered list with the input parameters to obtain a machine learning score and stores the machine learning score with the possible action in the filtered list; and
once the special purpose server processes the filtered list of possible actions, the special purpose server sorts the filtered list of possible actions by the score, selects the possible actions in the filtered list with high scores, and offers the user options to perform the selected possible actions;
wherein the machine learning model is built by the special purpose server through iterations of possible rule sets to identify the rule set with a best quality score using a data set of previous user behavior;
wherein the data set of previous user behavior utilizes the data of multiple users up to a threshold of data items for a specific user and then switches to solely using data from the specific user.

11. The system of claim 10 wherein the machine learning model is built with a DensiCube machine learning algorithm.

12. The system of claim 11 wherein the machine learning model is built with a distributed DensiCube machine learning algorithm.

13. The system of claim 10 wherein the machine learning model is built with a K-means machine learning algorithm.

14. The system of claim 10 wherein the machine learning model is built with a random forest machine learning algorithm.

15. The system of claim 10 wherein the data set of previous user behavior utilizes a graduated combination of the data of the multiple users combined with the data from a specific user weighted by a factor based upon a number of data items for the specific user.

16. The system of claim 10 wherein the input parameters also include location information.

* * * * *